(12) United States Patent
Small et al.

(10) Patent No.: US 9,266,117 B2
(45) Date of Patent: Feb. 23, 2016

(54) PROCESS AND SYSTEM FOR TREATING PARTICULATE SOLIDS

(71) Applicants: Jo-Ann Reif, Scranton, PA (US); Wave Particle Processing, Scranton, PA (US)

(72) Inventors: W. Murray Small, Scranton, PA (US); Matthew M. Kropf, Bradford, PA (US); Cyril J. Reif

(*) Notice: Subject to any disclaimer, the term of this patent is extended or adjusted under 35 U.S.C. 154(b) by 410 days.

(21) Appl. No.: 13/623,416

(22) Filed: Sep. 20, 2012

(65) Prior Publication Data

US 2013/0098808 A1   Apr. 25, 2013

Related U.S. Application Data

(60) Provisional application No. 61/536,794, filed on Sep. 20, 2011.

(51) Int. Cl.
- *B03B 7/00* (2006.01)
- *B01J 19/10* (2006.01)
- *B01J 19/20* (2006.01)
- *B03B 5/02* (2006.01)
- *C22C 1/00* (2006.01)

(52) U.S. Cl.
CPC . *B03B 7/00* (2013.01); *B01J 19/10* (2013.01); *B01J 19/20* (2013.01); *B03B 5/02* (2013.01); *C22C 1/005* (2013.01); *B01J 2219/089* (2013.01); *Y02W 30/54* (2015.05)

(58) Field of Classification Search
CPC ......... B03B 7/00; B01J 19/10; B01D 21/283; B01D 11/0261; B01D 11/0226; B02C 23/14; C02F 1/36

USPC ............. 209/210, 590, 906, 913; 210/748.02, 210/748.05; 204/157.15; 73/587
See application file for complete search history.

(56) References Cited

U.S. PATENT DOCUMENTS

| | | | |
|---|---|---|---|
| 2,985,003 A | 1/1957 | Gelfand et al. | |
| 2,950,725 A | 8/1960 | Jacke et al. | |
| 3,651,352 A | 3/1972 | Puskas | |
| 3,754,559 A * | 8/1973 | Seiwert | 134/65 |
| 3,807,704 A | 4/1974 | Janzen et al. | |
| 3,985,344 A | 10/1976 | McCord | |
| 4,064,885 A | 12/1977 | Dussault et al. | |
| 4,114,194 A | 9/1978 | Walter | |
| 4,120,699 A | 10/1978 | Kennedy, Jr. et al. | |
| 4,170,241 A * | 10/1979 | Clapp | 134/83 |
| 4,171,852 A | 10/1979 | Haentjens | |
| 4,193,635 A | 3/1980 | Thiruvengadam et al. | |
| 4,363,264 A * | 12/1982 | Lang et al. | 99/510 |

(Continued)

FOREIGN PATENT DOCUMENTS

WO   WO 2011079404 A1 *  7/2011

*Primary Examiner* — Joseph C Rodriguez
(74) *Attorney, Agent, or Firm* — Cowan, Liebowitz & Latman, P.C.; Mark Montague; Brian R. Volk

(57) ABSTRACT

System and method for treating particulate solids comprises a screw feeder for transporting a water-based slurry of contaminated particulate solids through an ultrasound signal of sufficient size, strength and duration to cause the contaminants to separate from the particulate solids. One or more stacks of ultrasonic transducers arranged around the screw feeder may be employed in which the diameter of each transducer preferably is substantially the same as the pitch of the screw feeder.

23 Claims, 7 Drawing Sheets

(56) References Cited

U.S. PATENT DOCUMENTS

| | | | |
|---|---|---|---|
| 4,375,991 A | 3/1983 | Sachs et al. | |
| 4,527,901 A | 7/1985 | Cook | |
| 4,607,185 A | 8/1986 | Elbert et al. | |
| 4,834,124 A | 5/1989 | Honda | |
| 5,076,854 A | 12/1991 | Honda et al. | |
| 5,164,094 A * | 11/1992 | Stuckart | 210/708 |
| 5,383,483 A | 1/1995 | Shibano | |
| 5,447,171 A | 9/1995 | Shibano | |
| 5,520,780 A * | 5/1996 | Walker | 162/4 |
| 5,529,753 A | 6/1996 | Haddad et al. | |
| 5,711,888 A * | 1/1998 | Trampler et al. | 210/748.05 |
| 5,717,181 A | 2/1998 | Colgate | |
| 5,865,199 A | 2/1999 | Pedziwiatr et al. | |
| 6,026,832 A | 2/2000 | Sato et al. | |
| 6,138,698 A | 10/2000 | Tanaka et al. | |
| 7,004,182 B2 | 2/2006 | Duval et al. | |
| 7,118,631 B2 * | 10/2006 | Philips | B01D 11/0226 134/1 |
| 7,336,019 B1 | 2/2008 | Puskas | |
| 7,780,921 B2 * | 8/2010 | Kimura | B01D 11/0226 266/168 |
| 7,814,919 B2 | 10/2010 | Sakurai et al. | |
| 8,540,798 B2 * | 9/2013 | Gomes et al. | 75/749 |
| 2002/0185150 A1 | 12/2002 | Namerikawa et al. | |
| 2006/0086646 A1 * | 4/2006 | Patist et al. | 209/164 |
| 2006/0088457 A1 * | 4/2006 | Kimura | 423/3 |
| 2008/0245137 A1 | 10/2008 | Tavlarides et al. | |
| 2010/0141013 A1 * | 6/2010 | Lahr | 299/16 |
| 2010/0230329 A1 * | 9/2010 | Kittrick et al. | 209/659 |
| 2011/0154890 A1 * | 6/2011 | Holm et al. | 73/61.75 |
| 2011/0200848 A1 * | 8/2011 | Chiang et al. | 429/4 |
| 2014/0319077 A1 * | 10/2014 | Lipkens et al. | 210/748.05 |

* cited by examiner

US 9,266,117 B2

PROCESS AND SYSTEM FOR TREATING PARTICULATE SOLIDS

REFERENCE TO RELATED APPLICATION

This application claims priority to U.S. Provisional Patent Application No. 61/536,794, filed Sep. 20, 2011, the disclosure of which is incorporated herein by reference.

BACKGROUND OF THE INVENTION

1. Field of the Invention

The present invention pertains to the treatment of the class of solid materials called particulates that includes assemblies of matter in individual units of size of about one inch or less.

2. Background Description and Brief Discussion of the Related Art

Particulate matter may have various origins. They may occur in nature, such as metal or petroleum sources, or they may be man-made, such as chips or filaments that are cut from the surfaces of metal bars during lathe processing. For each of these types, the particulate matter is in need of some kind of treatment, be it either elimination of a contaminant and impurity or the recovery of a valuable component. In either case, removal of a component from the particulate is a necessary step for a subsequent, value-added product.

For example, titanium machining chips are valuable and are re-melted and recycled for subsequent use. However, titanium machining chips get contaminated with a residual cutting oil, and the oil creates metallurgical problems during melting and casting of the metal. Therefore, it is critical that the oil be removed from the chips before they are recycled and reused.

In currently available cleaning systems and processes, the contaminated chips are washed in a large volume of scalding hot water with very high levels of caustic cleaning agents. However, such cleaning systems and processes disadvantageously result in a liquid by-product of high pH. Such systems and processes also disadvantageously require the cleaning solution to reach relatively high temperatures, require sufficient caustic chemical cleaning agents to achieve the desired high pH, and require subsequent neutralization treatment of the effluent solution in order to avoid dealing with a hazardous waste. These requirements, individually and in combination, result in a high treatment cost and a relatively large amount of by-products.

Several cutting-edge alternative processes can be considered in place of the cleaning process described above. First, a treatment process may employ enzymatic agents; but, while such a process reduces temperature requirements and alleviates the waste concerns, the enzymes that are required disadvantageously are expensive and are terminal in use as they are disposed of in the by-product. As another possible technique, the chips may be chemically treated with a strong nitric and hydrofluoric acid solution, but disposal of the liquid by-product would be hazardous since it would contain quantities of the fluoride ion. As yet another possible technique, titanium chips may be cleaned with a spray of tiny abrasive glass particles, but adhesion of the glass particles to the surfaces of the oil coated chips reduces the affectivity of this process.

OBJECTIVES AND SUMMARY OF THE INVENTION

In view of the foregoing, it is therefore desirable and thus an objective of the present invention to provide systems and processes for treating particulates that result in one or more than one of the following benefits: reduction in the cleaning time; reduction in the temperatures employed; reduction in the amount of chemical reagents used; the use of milder cleaning reagents; reduction of the amount of by-product; and/or the reduction or elimination of the need to neutralize the by-product.

In accordance with the present invention, a system for treating particulate solids comprises an ultrasonic transducer producing an ultrasound signal, a rotating screw feeder having a portion extending through an active region of the ultrasound signal produced by the ultrasonic transducer, the screw feeder having a plurality of flights each separated from one another by a predetermined distance, called the pitch, that is no greater than a width of the active region of the ultrasound signal, and a slurry including water and the particulate solids disposed within the screw feeder in which the particulate solids are contained within chambers defined by the flights of the screw feeder and move along the screw feeder as the screw feeder rotates, the particulate solids contained within a chamber disposed within the active region of the ultrasound signal being sufficiently agitated by the ultrasound signal to cause contaminants to separate from the particulate solids contained within the chamber.

In accordance with a method embodiment of the present invention, a method of treating particulate solids comprises the steps of supplying a screw feeder for transporting contaminated particulate solids, supplying a continuous flow of water through the screw feeder, supplying the particulate solids into the screw feeder, the particulate solids and the water forming a slurry, supplying an ultrasound signal, and transporting, by the screw feeder, the slurry containing the particulate solids through the ultrasound signal for a predetermined amount of time, and wherein the ultrasound signal is of sufficient size and strength to cause the contaminants to separate from the particulate solids.

In the system and method embodiments summarized above, various aspects of the invention are as follows.

As one aspect of the invention, a plurality of ultrasonic transducers are disposed circumferentially around a perimeter of at least a portion of the screw feeder, and each of the ultrasonic transducers produces a respective ultrasound signal.

As another aspect of the invention, a stack of ultrasonic transducers are disposed along a portion of an exterior of the screw feeder, and each of the ultrasonic transducers produces a respective ultrasound signal and has a diameter substantially the same as the pitch of the screw feeder.

As a further aspect of the invention, the screw feeder, while moving the slurry, provides a turbulence to the slurry to cause the particulate solids to be stirred and rotated.

As yet another aspect of the invention, the ultrasonic transducer produces an ultrasound signal having frequencies substantially within a range of 25 kHz and 45 kHz.

As yet a further aspect of the invention, the slurry contains detergent in an amount of substantially no greater than 0.2 weight % of the amount of water.

As yet another aspect of the invention, the slurry contains detergent in an amount of substantially no greater than 1.0 weight % of the amount of water.

As yet an additional aspect of the invention, the water is at a temperature not exceeding substantially 120 degrees Fahrenheit.

Still as yet another aspect, at least a portion of the water exiting from a water exit end of the screw feeder (e.g., 80% of the water) is recycled back to a water entrance end of the screw feeder.

As a feature of this aspect, detergent is added to the recycled water sufficient to prevent recontamination to the particulate solids by the contaminants disposed within the recycled water.

In accordance with another embodiment of the present invention, a system for treating particulate solids comprises an ultrasonic transducer producing an ultrasound signal, a tank having a chamber substantially fully disposed within an active zone of the ultrasound signal, a slurry including water and the particulate solids, the chamber of the tank containing the particulate solids of the slurry within the active zone of the ultrasound signal, wherein the ultrasound signal agitates the particulate solids disposed within the entire chamber sufficient to cause contaminants to separate from the particulate solids.

Various aspects summarized above also are applicable to this system embodiment.

Various other objectives, advantages and features of the present invention will become readily apparent to those of ordinary skill in the art, and the novel features will be particularly pointed out in the appended claims.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE PRESENT INVENTION

The inventors of the present invention, as part of the company Wave Particle Processing, have produced the herein described apparatuses and methods to facilitate the removal of materials from particulate substrates with the advantageous features mentioned above.

As herein described, the present invention employs ultrasonic transducer stacks in a unique configuration specific to the treatment of particulates. In summary, the present invention temporarily confines particles of interest, such as contaminated titanium chips, in a water-based slurry containing a small amount of mild detergent, where it is desired to remove the contaminant. Then, the articles are exposed to the active regions of a resonant ultrasonic transducer stack while simultaneously facilitating mild turbulence of the slurry to a sufficient magnitude to agitate the particles within the active ultrasonic zones.

Various structures and manners of carrying out the above-summarized steps are described herein. First, the particulates are confined within the resonant ultrasonic transducer's active region by employing at least either of the following arrangements:

i. Arranging sidewalls in a single chamber on the order of the diameter of the ultrasonic transducer that completely surround the active ultrasonic zone (also referred to herein as the "single chamber" embodiment);

ii. Arranging sidewalls on only two sides of the active ultrasonic zone separated by a distance on the order of the diameter of the active zone and that are in motion traversing the active zone, as in flights of a screw feeder, separated by a pitch distance p, as depicted in the schematic illustration shown in FIG. 1 (also referred to herein as the "screw feeder" embodiment).

Each of these embodiments/arrangements, as well as variations thereof, is described in further detail below.

In each version, simultaneous agitation is applied to the confined ultrasonic regions or zones, individually, in combination, or in sequence from: (i) dynamic pressure gradients achieved through fluid flow; (ii) the mechanical motion of the aforementioned confining sidewalls; and/or (iii) the action of the ultrasound assisting in forming migrating particles within the confined treatment zone.

Figure 2:
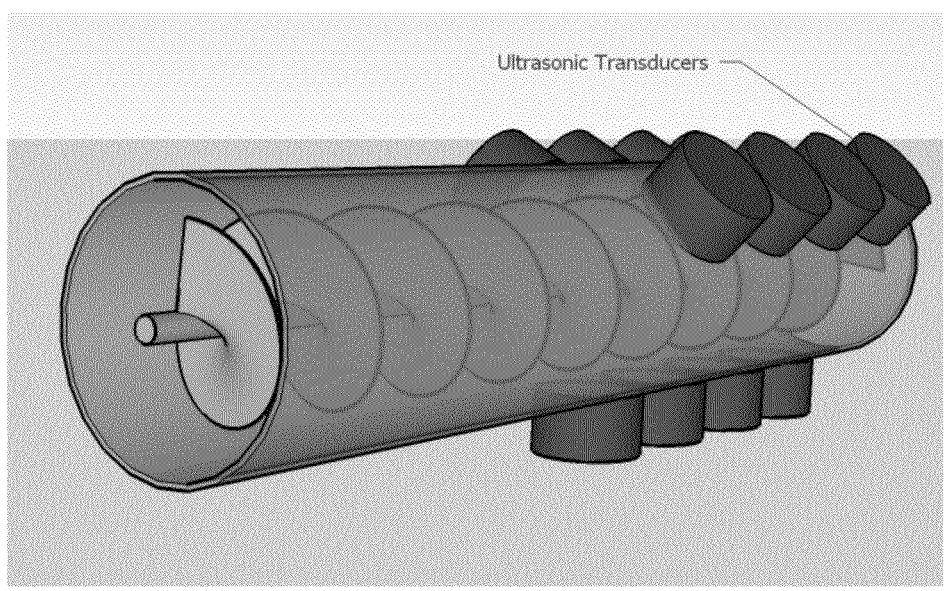
FIG. 2 is another schematic illustration of a screw feeder having a series of ultrasonic transducers in accordance with the screw feeder embodiment of the present invention.

The ultrasound treatment is carried out by employing ultrasonic frequencies preferably within the range of 25 kHz and 45 kHz. In the screw feeder embodiment briefly summarized above, a series of ultrasonic transducers is placed circumferentially on the perimeter of the screw feeding system, such as schematically shown in FIG. 2.

The treatment results in a stabilization of the removed oil and fine dirt in the water and detergent in the form of: (1) a stable emulsion of two immiscible fluids, wherein the dispersed phase of the emulsion contains droplets of less than 10 micrometers; (2) a stable dispersion of small solids and a fluid; and/or (3) a stable emulsified dispersion consisting of solids and two immiscible fluids.

Preferably, the slurry contains solid particles no greater than 1 inch in any dimension. The slurry also preferably contains a water to particle weight ratio of no greater than 10:1, or 8:1, or 5:1. The slurry further preferably utilizes mild detergent concentrations of greater than 0.2% weight of water.

Figure 3:
FIG. 3 is a photograph of an exemplary ultrasound tank and a power supply that may be used with the present invention.

In accordance with the present invention, the above-summarized "single chamber" embodiment entails cleaning particulates, such as titanium chips, within an ultrasound tank. Exemplary ultrasound tanks that may be employed are those supplied by Advanced Sonic Processing Systems, Inc. of Oxford, Conn. A photograph of an exemplary ultrasound tank and a power supply is shown in FIG. 3.

The tank chamber, which may be made of stainless steel, has, for example, an internal volume of 400 in$^3$, and the power supply is capable of delivering a signal of 18-20 KHz and 300-500 watts of alternating current power to two magnetostrictive transducers located on the tank's bottom. Of course, other ultrasound tanks having different volumes and power supply requirements, and a different number of transducers, may be employed. During operation, the vibration of the transducers produces an ultrasound signal that is transmitted into a bath of water in the tank.

During testing of the present invention, two different types of raw titanium machining chips were used: (1) a first type from a conventional machining source with an average particle length of around 10 mm (herein identified as "conventional" chips) and shapes ranging from flat plates to curlicues; and (2) a second type from a finer variety of roughly 1 mm chips produced from electron discharge machining (herein identified as the "fine" chips). A quantity of chips was placed in a casserole-size dish, and warm water was poured over the chips within the dish. The dish was placed inside the tank (or "chamber") on top of a water bath about 2 inches high. The transducers were powered, resulting in the ultrasound signal, which in turn caused progressive removal of oil from the chips. During testing, the water gradually became milky, which was an indication of oil being removed from the chips by the ultrasound energy.

In accordance with the present invention, portions of the chips that resided in the herein-called "ultrasound active zones" (or, simply, "active zones") responded to the ultrasound substantially more than those portions of the chips that resided outside the active zones (for convenience, such areas outside the active zones are referred to herein as "dead zones"). In other words, chips that resided within the dead zones lay reasonably dormant within the tank and accordingly far less oil was removed from those chips as compared to the amount of oil that was removed from the chips within the active zones.

Moreover, the rates of oil removal from the two different types of chips (i.e., the conventional chips and the fine chips) are substantially different. For the fine chips, the rate of removal is substantially higher, wherein during testing there were intense plumes of oil during cleaning of the fine chips. For the conventional chips, the rate of removal, while still high as compared to prior art techniques, is lower than that for the fine chips, most likely due to the differences in total surface area between the two types of chips.

Figure 4A:
FIGS. 4A through 4D are a series of photographs showing the progress in cleaning a sample of titanium chips during the passage of time in accordance with the present invention.
Figure 4B:
Figure 4C:
Figure 4D:

FIGS. 4A through 4D, a series of photographs, show the progress in cleaning a sample of titanium chips during the passage of time in accordance with the present invention. FIG. 4A shows a clear slurry at the initial state. FIG. 4B shows, at the onset of the ultrasound cleaning process, the rapid development of a milky appearance of the slurry. FIG. 4C shows the slurry after 1 minute of cleaning. FIG. 4D shows the slurry after 5 minutes of cleaning. Thus, as shown in these photos, the water gets progressively milkier, evidence of the gradual removal of oil from the chips, as time progresses.

Preferably, during the herein-described treatment of contaminated chips, the water is maintained at a temperature of between 115 and 120 degrees Fahrenheit, in order to increase the rate of oil removal from the chips. However, at higher temperatures, the herein-described treatment process still results in effective removal of contaminants from particulates.

In addition, a small amount of preferably biodegradable, mild detergent, such as mild dishwashing liquid, may be added to the bath (i.e., the dish within the tank). The presence of the detergent results in an increased cleaning rate of the chips as compared to treatment without detergent. For example, a standard amount of detergent at 0.2 weight % of the amount of water may be added to each batch being cleaned. However, when circumstances warrant it, such as with substantially oily metal chips, a higher amount of soap, but not exceeding 1.0 weight % of water, may be used. Unlike the prior art, where substantial soap additions are made to the process water for the specific purpose of reacting with the oil adhering to the metal chips and thereby removing the oil, in this application the soap addition serves solely as an emulsifier for the oil removed from the chips. No cleaning function accompanies the soap addition in this process.

Water to chip weight ratios of 10:1, 8:1 and 5:1 were successful during the herein-described treatment. The lower ratios may be preferred since they require smaller containment areas in which to treat the same volume of particulates.

In connection with this embodiment of the present invention, the dish containing the particulates may cause, depending on what it is made of (e.g., glass), a reduction in the amount of ultrasound energy that is applied to the particulates themselves (thus resulting in reduced efficacy of the treatment). Therefore, the present invention includes the appreciation of the structure, design and materials of the vessel in which the contaminated particulates are contained during such treatment. Accordingly, in a variation of the above-described embodiment, the chips may be contained within the ultrasound tank itself during their treatment.

Figure 5:
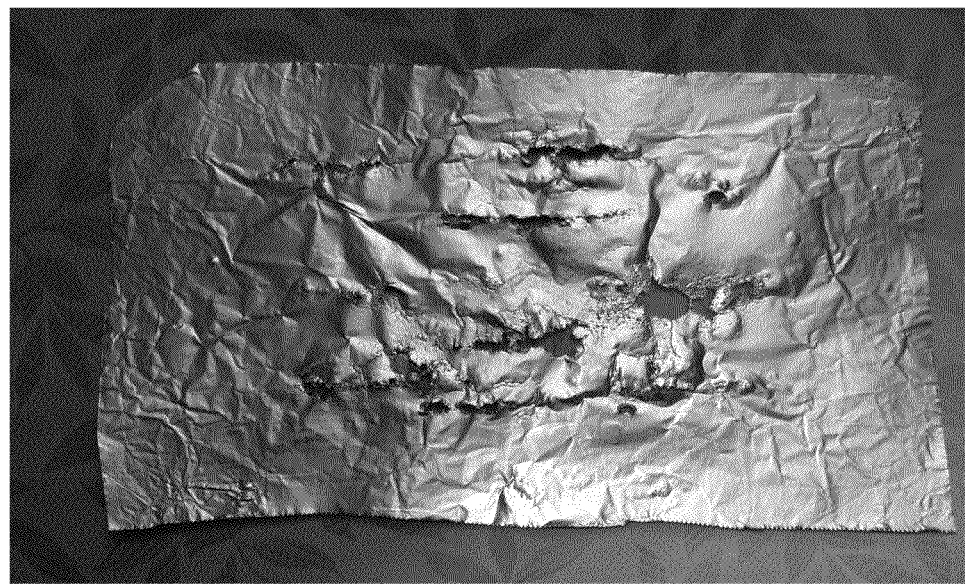
FIG. 5 is a photograph of a sheet of aluminum foil that has undergone "treatment" within the ultrasound tank of the present invention.

As mentioned above, the inventors hereof have recognized the existence of active and dead zones of the ultrasound. In accordance with the present invention, the structure, shape and design of the vessel containing the particulates (the "containment vessel") during treatment preferably should contain the contaminated particulates (or the bulk of the contaminated particulates) within the active zone(s) of the ultrasound. FIG. 5 is a photograph of a sheet of aluminum foil that has undergone "treatment" within the ultrasound tank. The eroded/destroyed areas of the foil correspond to active zone (s) or regions of high ultrasound intensity. The other portions of the foil (that remained intact) were not exposed to ultrasound and correspond to the dead zones.

Figure 6:
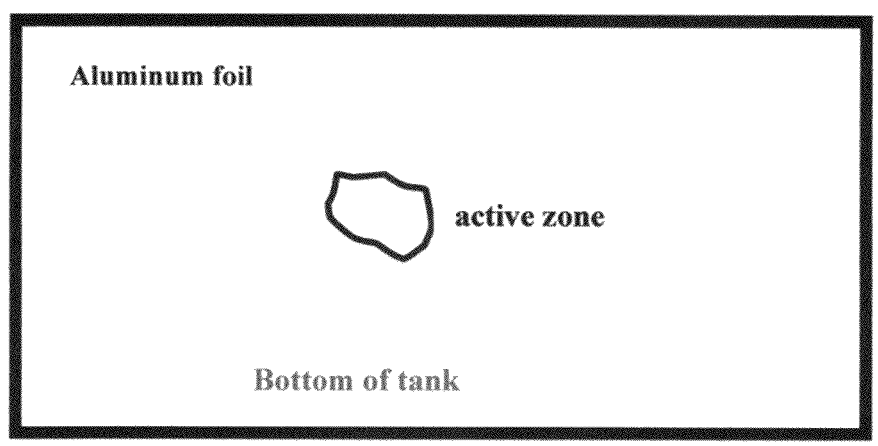
FIG. 6 is a schematic illustration showing a single active zone in accordance with the present invention.

The foil shown in FIG. 5 was placed at the bottom of the ultrasound tank. Additional tests included placing individual sheets, vertically and horizontally, at different locations within the tank. In each instance, active and dead zones were detected. In accordance with the present invention, it was discovered that a single, highly active zone exists in the center of the ultrasound chamber, wherein during testing one very large hole was created in a foil placed upright in the center of the chamber. FIG. 6 shows a schematic illustration of that single active zone, which is located a distance from the bottom of the ultrasound tank.

In accordance with the present invention, the particulates should be maintained inside the above-described highly active zones, or at least within sufficiently active zones, inside the treatment chamber to maximize the effectiveness of the process. During testing, a sample of titanium chips was manually held within the aforementioned highly active zone and, during treatment, the chips were cleaned very quickly.

However, the inventors hereof discovered that treating a sample of chips within a container that is positioned freely within the active zone results in the chips' movement, upon application of the ultrasound, to those portions of the container in which the ultrasound field was either non-existent or smallest. During testing, the chips quickly accumulated near the sides of the container where the ultrasound was weakest (or non-existent). This resulted in a substantial reduction in cleaning rate as compared to the above-described situation of treating samples manually held within the active zones. Moreover, due to the chips' small size (i.e., with dimensions smaller than about 1 inch), many chips within the container are able to (and, in fact, do) assemble within all available dead zones, thereby reducing the efficacy of the treatment. This problem is not encountered or only minimally deleterious if substantially large objects are treated by the herein-described process.

Accordingly, and in accordance with the present invention, treatment is maximized when the particulates to be cleaned are disposed or confined for a sufficient amount of time within the active portion of the ultrasound field. Therefore, the present invention employs a containment chamber that is itself fully disposed within the active zone of the ultrasound field to ensure that the contained particulates are within the active zone during treatment. Accordingly, if the walls of the containment chamber are of a sufficient arrangement so that the contained material is completely within the active zone of the ultrasound (which is the above-summarized "single chamber" embodiment), then treatment of the particulates within the containment chamber is maximized, as herein described.

In a version of the above-described single chamber embodiment, multiple "single chambers" are arranged on a conveyor belt type arrangement wherein each chamber, having particulates stored within, is transported through one or more ultrasound fields in order to clean the particulates within the chambers. In such version, each chamber is loaded with a set amount of particulates to be cleaned at an initial, loading position, then moved through the active portion of an ultrasound field, and finally moved to an unloading position, where the treated particulates are removed from the chamber. By using a conveyor belt type arrangement, multiple chambers may be employed simultaneously, in succession, where each chamber passes one at a time (or two at a time, or three at a time, etc.) through the active portion of the ultrasound field. Water, with or without the above-mentioned detergent, can be manually placed within and removed from each chamber for each pass. For relatively large operations, it may be preferable to pump water through each of the chambers automatically during operation. In addition, the ultrasound field may be comprised of multiple ultrasound fields.

Figure 7:
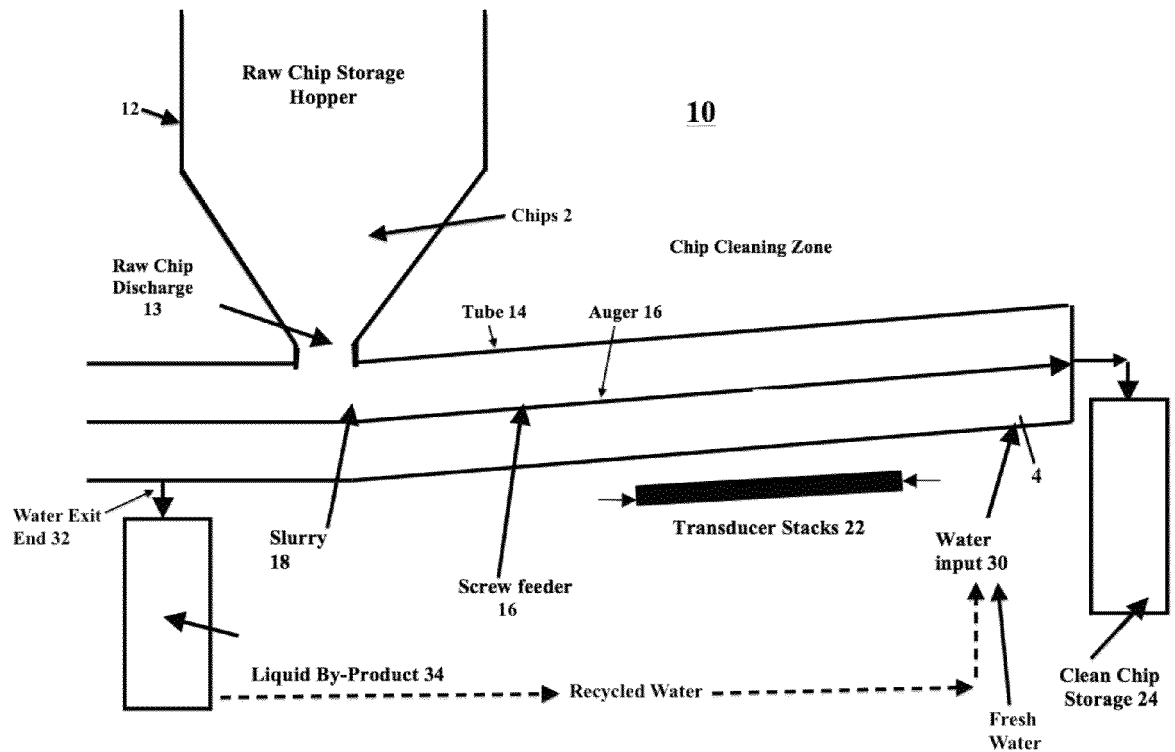
FIG. 7 is a schematic illustration of the system for treating particulate solids in accordance with the screw feeder embodiment of the present invention.
Figure 8:
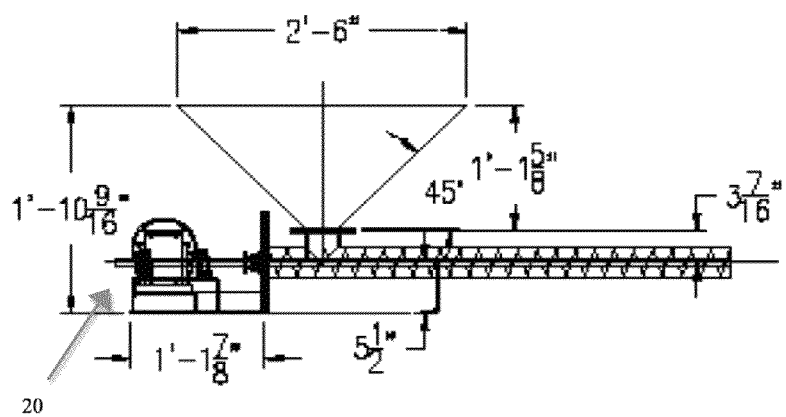
FIG. 8 shows a portion of the system for treating particulate solids in accordance with the screw feeder embodiment of the present invention.

Turning now to the screw feeder embodiment briefly summarized above, FIGS. 7 and 8 schematically illustrate the operation and structure of the screw feeder embodiment of the present invention.

Figure 1:
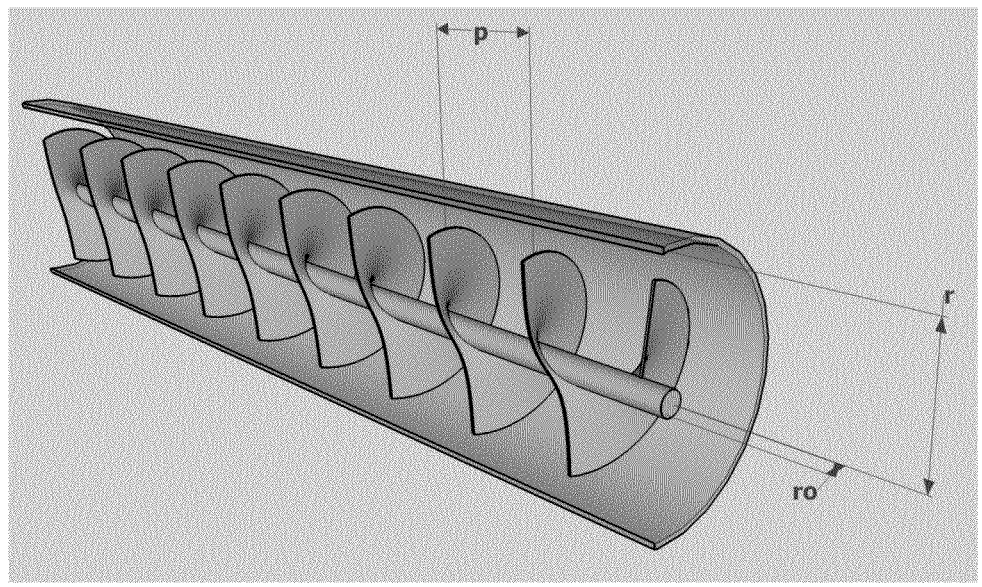
FIG. 1 is a schematic illustration of a screw feeder used to describe the screw feeder embodiment of the present invention.

FIG. 7 is a schematic illustration of the system 10 for treating particulate solids in accordance with the screw feeder embodiment of the present invention, and FIG. 8 shows a portion of the system. Initially, a supply of raw chips 2 (i.e., particulates to be treated) is loaded into a hopper 12. Hopper 12 preferably is conical in shape and may be made out of steel or other suitable material. The raw chips 2 exit the bottom 13 of the hopper at a desired flow rate and drop into a horizontally disposed tube 14. An auger 16 is disposed within the tube 14, such as shown in FIGS. 1 and 2. Tube 14 and auger 16 collectively are referred to as screw feeder device 16 (or, simply, the screw feeder). Auger 16 is suitably sized relative to the width of tube 14 so that chips are unable to pass through any space (which is substantially small relative to the size of the chips) that exists between the blades of the auger and the tube. Preferably, the thicknesses of the blades, called flights in the screw feeder, and their spacing have uniform and well-defined geometries.

The raw chips 2, now disposed within screw feeder 16, encounter water 4 to form a slurry 18. Water 4 may flow or counter-flow through screw feeder 16. In the counter-flow version, water is introduced at a water entrance end 30 and exits, as liquid by-product 34, at water exit end 32. In the flow version, the water entrance and exit ends are reversed. Water that is introduced into the system, in both the flow and counter-flow versions, is fresh water. However, the present invention entails water recycling versions, which are discussed in detail below (with reference to FIGS. 9-12).

A variable speed motor 20 (shown in FIG. 8) causes the slurry 18 to move along tube 14 (to the right in FIG. 7) at a defined rate. A series of ultrasound transducers 22 (stacks 22) are disposed along a section of the screw feeder's tube 14 that treat the chips in the manner described herein. The treated chips then are separated from the liquid-by-product by filtration and are subsequently dried and stored within clean chip storage 24. The dried, treated chips are then packaged for subsequent use (or reuse/recycling). FIG. 8 shows exemplary dimensions of hopper 12 and various other components of the system, but it is understood that other suitable dimensions may be employed.

During operation, the variable speed motor 20 preferably can operate at different speeds to enable the treatment of raw chips at rates of between 24 to 240 pounds of chips per hour. In general, operation at the low end of this range can be utilized, for example, to demonstrate the treatment operation of the system, whereas operation at the upper end of this range may be suitable for the day-to-day operation of a semi-commercial plant.

Referring again to FIG. 2, this schematic illustration shows a set of stacks of transducers mounted along the tube. Each stack is positioned above two adjacent blades/flights of the screw feeder such that the diameter of the transducer cross-section equals the pitch of the screw feeder. With such configuration, a slurry of chips and water flowing between the transducers is attacked by a strong stream of ultrasound across the entire pitch of the screw feeder. Advantageously, and in accordance with the present invention, the chips are confined within the tube and between the blades of the screw feeder in such a manner that the chips remain in the active field of the ultrasound. Moreover, the slurry, in addition to being moved by the rotation of the screw feeder, is gently stirred and rotated by such movement thereby exposing all sides and crevices of each chip to the ultrasound field. Preferably, the screw feeder flight design causes slight turbulence to the slurry thus causing the chips to being meaningfully stirred and rotated during their flow through the tube.

As described herein, the process and system for treating particulate solids of the present invention entail, in certain embodiments, the following features: (1) formation and transport of a slurry of the particulates and water using a screw feeder; (2) screw feeder flights that produce a turbulence in the slurry to cause the particulates to be stirred and rotating as they move through the tube; (3) at least one transducer stack, but preferably multiple stacks, mounted on the outside of the tube of a certain size so that the diameter of each transducer element equals the screw feeder pitch (i.e., the distance between adjacent flights); (4) the stirred, rotating chips in the slurry are given an intense dose of ultrasound energy so that the chips are treated as described herein; and (5) the number of transducer stacks can be modified as needed based on the particular application as well as difficulty of removing the component of interest (e.g., contaminant).

Moreover, as described herein, the present invention entails exposing a set of chips to an intense field of ultrasound wherein the arrangement and sizes of the various components of the system cause the chips to be contained within the active field of the ultrasound for a sufficient period of time. In the screw feeder embodiment, the chips to be treated are contained within a suitably sized tube and between adjacent flights of the screw feeder so that the chips are unable to escape exposure to the radiation.

Comparison to the state of the art treatment of titanium machining chips with the present invention can be made with at least 2 performance metrics that are: (1) treatment of three different classes of titanium chips in accordance with certain embodiments of the present invention achieves industry-acceptable results, as demonstrated by after-treatment analysis of the treated chips, with the treated chips containing as low as 0.015% carbon; (2) a pH of the attendant liquid by-product used during treatment in accordance with the present invention that remains very close to neutral [7.0], and occasionally rising to a maximum of about 8.0, as compared to pH levels in the vicinity of 11 for the liquid by-product of prior art techniques.

The improvements over prior art treatment techniques would be an unexpected result by someone skilled in the art considering that the process uses from 0.2 up to 2.0 weight percent of a mild detergent by the present invention, as compared to an order of magnitude higher caustic detergent usage in prior art techniques resulting in a cleaning index for the present invention that is as high as 1,500 pounds of treated titanium per gallon detergent, almost 20 times above the productivity of prior art techniques. Besides, the process does not require elevated temperatures or long residence times. The almost neutral condition and degree of dispersion or emulsification of the contaminant into the attendant water permits easy disposal.

In accordance with the present invention, the herein-described process and system for treating particulate solids of the present invention further entail partial or full recycling of the liquid-by-product, as further discussed below.

The metal chip cleaning process of the present invention employs no alkaline reagents. Hence, the liquid by-product from the reactor is very close to the neutral condition [pH=7] and, therefore, the liquid by-product does not need neutralization. Rather than discard the liquid by-product, it can be processed for the recovery of its retained oil but, moreover, it is recycled as herein described.

Figure 9:
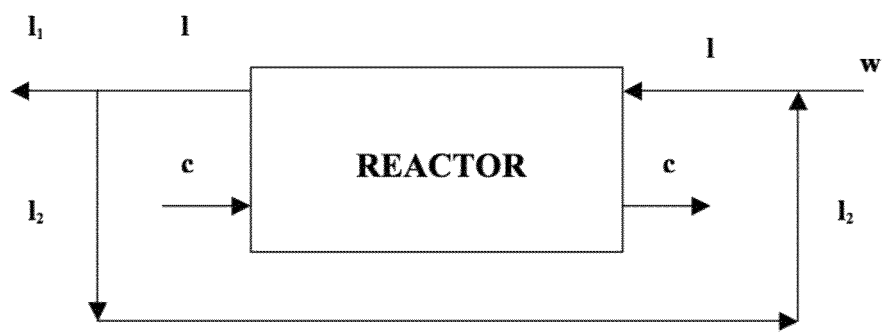
FIG. 9 is a schematic representation of the steady state flow of liquid and chips through the reactor with liquid by-product recycled in accordance with the present invention.

Referring to FIG. 9, a schematic representation of the steady state flow of liquid and chips through the reactor with liquid by-product recycling of the present invention is shown. The symbols 1 and c denote the liquid and chip streams entering and leaving the reactor, respectively. At the reactor exit (see also FIG. 7, water exit end 32), a portion of the liquid by-product, $I_1$ is withdrawn for separate treatment while the remainder $I_2$ is returned to the reactor (see also FIG. 7, water input 30). At the reactor entrance, the recycled liquid is blended with a quantity of fresh water w to form the total liquid input to the reactor. As mentioned above, the water may flow or counter-flow through the screw feeder. In the flow version, water input 30 and water exit end 32 shown in FIG. 7 are reversed, as are the directions of the arrows representing water flow in FIG. 9, as well as in FIG. 10.

Recycling liquid to the reactor is accompanied by the return of oil previously removed from other chips. To avoid recontamination of the freshly cleaned chips in the reactor, a suitable quantity of detergent is added to the liquid stream entering the reactor.

In this mode of partial liquid recycle of the present invention, the net water to chip ratio [w/c] declines with operating time and can reach an acceptable level of 2-3 within eight hours of reactor operation. The quantity of oil in the liquid by-product is calculated to remain below 4 volume percent while the reactor is operated in the partial recycle mode for up to eight hours. Afterwards, the total amount of recycled liquid should be taken for separate processing for oil recovery and the reactor restarted with a fresh supply of water.

Figure 10:
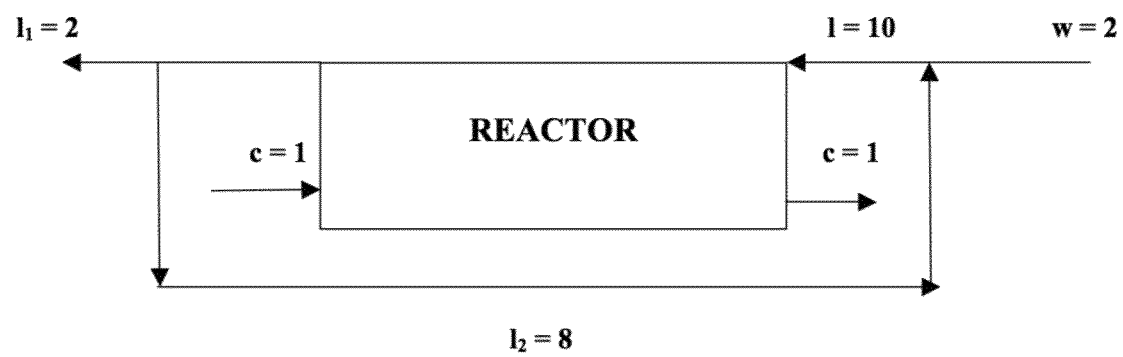
FIG. 10 shows an exemplary steady state flow of liquid and chips through the reactor.

FIG. 10 shows an exemplary steady state flow of liquid and chips through the reactor employing an overall w/c ratio of 10. A chip supply of 1 pound per hour [c=1] therefore results in a total amount of liquid entering and leaving the reactor of 10 pounds per hour [I=10]. In the example shown in FIG. 10, 80 percent of the liquid by-product leaving the reactor is recycled and returned to its inlet. Therefore, 8 pounds per hour [$I_2$=8] recycled liquid is used. This returned liquid is supplemented by 2 pounds per hour of fresh water [w=2]. At the outlet, 2 pounds of by-product is permanently removed from the reactor [$I_1$=2] and optionally, subsequently processed further for recovery of the oil.

For purposes of assessing the oil content of the liquid by-product, the incoming metal chips are assumed to initially contain 3.95 weight percent carbon as an indication of their oil content. Generally, this carbon content corresponds to the case of the dirtiest chips ordinarily faced in cleaning operations. Mass balance calculations were performed for the reactor operating for eight consecutive hours, which may represent a typical operating shift for a reactor. The oil content of the outgoing reactor liquid by-product was calculated from the total of the oil content of the re-entering liquid plus the quantity of oil removed from the chips during their passage through the reactor. This calculation sequence was continued for each succeeding hour of the eight hour working shift.

Figure 11:
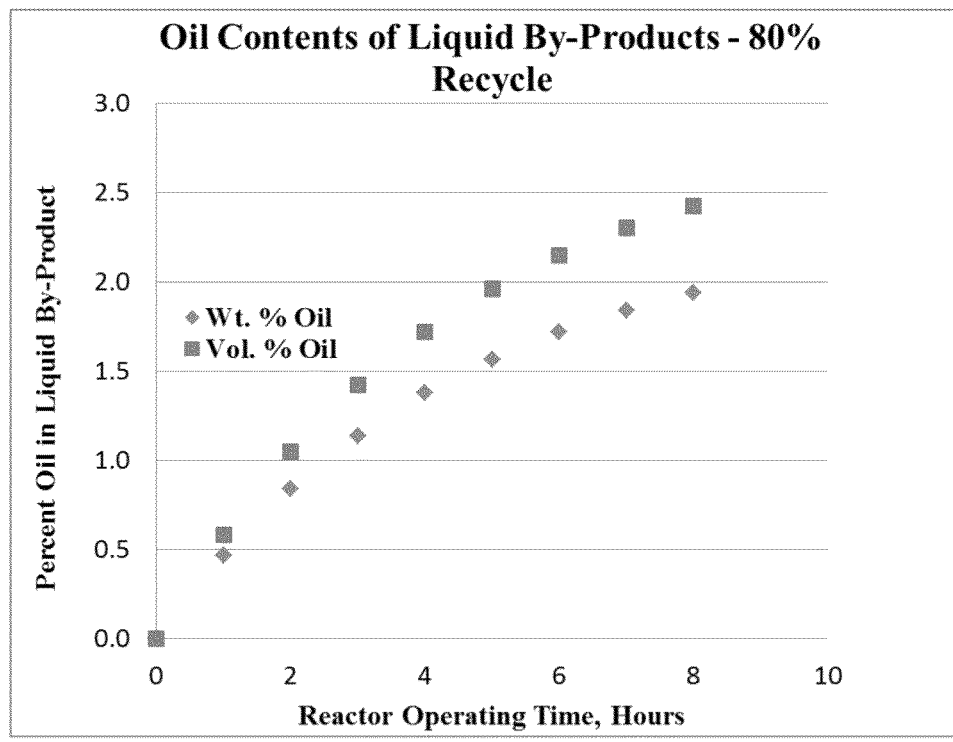
FIG. 11 is a graph showing the calculated oil contents of the liquid by-product as a function of reactor operating time, while employing partial recycling, in accordance with the present invention.

FIG. 11 shows the calculated oil contents of the liquid by-product as a function of reactor operating time. The oil contents are expressed both in weight and volume percents. As shown, the oil content on both bases rises monotonically with time. At first, the rise is sharp but then it gradually tapers. At the end of eight hours of reactor operation, the oil content of the by-product liquid is 1.94 wt. percent, and equivalently 2.42 vol. percent.

Full recycling of the liquid by-product may be employed. In such case, the total amount of liquid by-product is recycled with no removal of by-product and no supply of fresh water. Using a w/c of 10 and a chip input rate of 1 pound per hour [c=1], such as was the case in the prior example discussed above, the total amount of liquid entering and leaving the reactor is 10 pounds per hour [I=10], but the entire amount of liquid is recycled [$I_2$=10] with no by-product removed [$I_1$=0].

Figure 12:
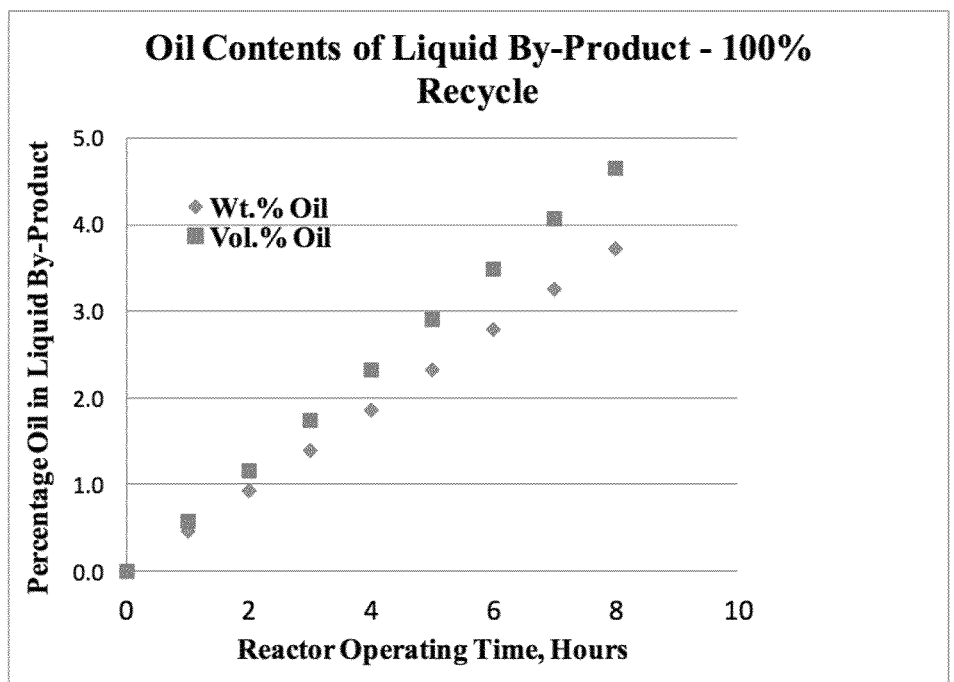
FIG. 12 is a graph showing the calculated oil contents of the liquid by-product as a function of reactor operating time, while employing full recycling, in accordance with the present invention.

The results of full recycling are shown in FIG. 12, where it is seen that the oil contents of the liquid by-product [on both bases] rise in linear fashion with time during the 8 hour operating shift sequence. At the end of the shift, the oil content of the liquid by-product was slightly over 3.7 weight percent and almost 4.7 volume percent.

Given the results of the examples discussed above, employing partial liquid recycling in the present invention beneficially results in oil contents of the liquid by-product (on both percent bases) that are respectively one half of those calculated for the case of complete liquid recycle. Moreover, partial liquid recycling results in a net w/c ratio for metal chip cleaning of almost 3, much lower than that if no liquid recycle is employed.

As mentioned above, recycled liquid contains oil previously removed from other chips. Prior to re-introducing the recycled liquid to the reactor, an appropriate quantity of detergent is added to the recycled liquid to emulsify and stabilize the oil.

Figure 13:
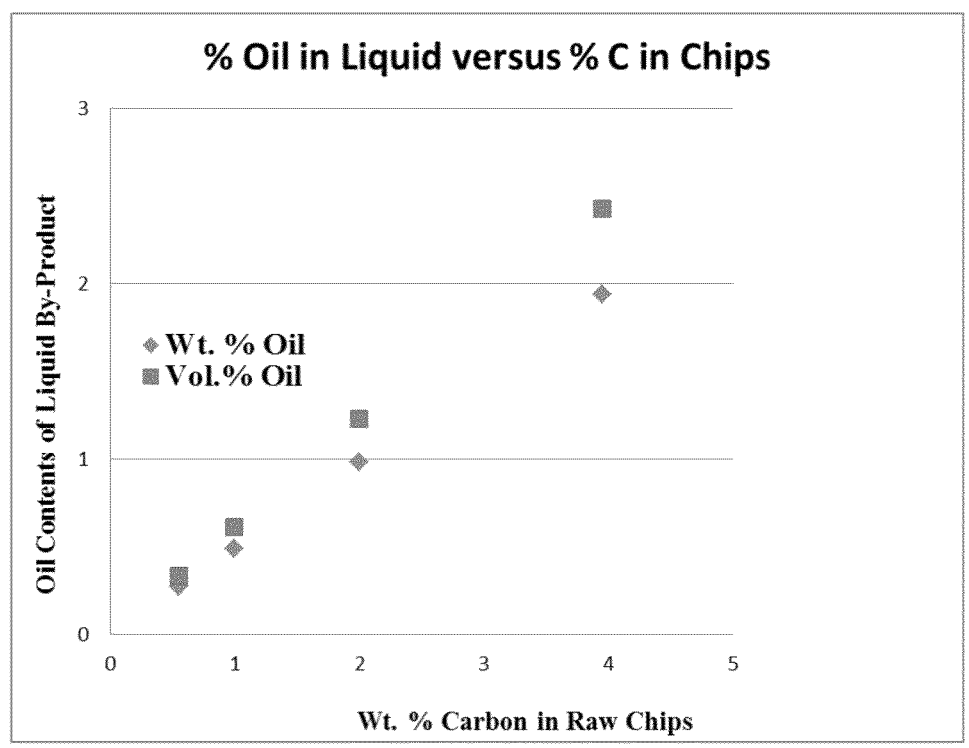
FIG. 13 is a graph showing a downward trend in oil content of liquid by-product as the carbon content of the chips declines for the case of 80 percent liquid recycle in accordance with the present invention.

In FIG. 13, a downward trend in oil content of liquid by-product is shown as the carbon content of the chips declines for the case of 80 percent liquid recycle. As shown, a declining oil content of the chips leads to less oil in the liquid. For example, chips bearing 0.55 weight percent carbon are associated with a liquid by-product of 0.27 weight percent and 0.34 volume percent oil.

Recycling of liquid by-product in combination with the herein-described process/system for treating particulate solids beneficially reduces water use, but provides further benefits including yielding a relatively low oil level in the liquid by-product, and little to no concern with chip recontamination due to the use of a suitable detergent. Moreover, the partial removal of liquid by-product from and the addition of fresh water to the reactor, both in small amounts, act as control agents to limit the growth of oil content of the by-product during successive recycling steps. And, as discussed above, compared to the w/c ratio of 10 for the reactor with no recycle (under certain circumstances), the value of this parameter for 80 percent liquid recycle is nearly 3.

Whether the present invention is employed with no recycling, partial recycling or full recycling, the liquid by-product ideally possesses an almost neutral pH [7-8] and thus poses no danger to either the reactor components or workers. In contrast, the liquid by-product of conventional chip cleaning processes has a pH in the range of 11-12.

Having described various embodiments of the present invention, as well as variations thereof, the present invention may be modified and applied in different ways than those described herein. In particular, the present invention can be applied to treat other materials including particulates of austenitic stainless steels, nickel based super-alloys, aluminum and zirconium to name a few. In addition, the contaminant to be removed from the particulates by the present invention may be, but is not limited to, oil, scale, cutting fluids, solder, industrial product markings, and coatings. Moreover, the present invention may also be applied to treat sand particles containing embedded petroleum-based droplets, such as tar, oil, and waxes. Finally, the present invention further may be applied to printed circuit board particles for recovery of embedded solder beads and remnants of copper wiring.

Therefore, it is understood that other expedients known to those skilled in the art or disclosed herein may be employed without departing from the spirit of the invention. It is thus intended that the appended claims be interpreted as including the embodiments described herein, the alternatives mentioned above, and all equivalents thereto.

What is claimed is:

1. A system for treating particulate solids, comprising:
   an ultrasonic transducer producing an ultrasound signal;
   a rotating screw feeder having a portion extending through an active region of the ultrasound signal produced by the ultrasonic transducer, the screw feeder having a plurality of flights each separated from one another by a predetermined distance that is no greater than a width of the active region of the ultrasound signal; and
   a slurry including water and the particulate solids disposed within the screw feeder in which the particulate solids are contained within chambers defined by the flights of the screw feeder and move along the screw feeder as the screw feeder rotates, the particulate solids contained within a chamber disposed within the active region of the ultrasound signal being sufficiently agitated by the ultrasound signal to cause contaminants to separate from the particulate solids contained within said chamber.

2. The system of claim 1, comprising a plurality of ultrasonic transducers disposed circumferentially around a perimeter of at least a portion of the screw feeder, each of the ultrasonic transducers producing a respective ultrasound signal.

3. The system of claim 1, comprising a stack of ultrasonic transducers disposed along a portion of an exterior of the screw feeder, each of the ultrasonic transducers producing a respective ultrasound signal and having a diameter substantially the same as a pitch of the screw feeder.

4. The system of claim 1, wherein the screw feeder, while moving the slurry, provides a turbulence to the slurry to cause the particulate solids to be stirred and rotated.

5. The system of claim 1, wherein the ultrasonic transducer produces an ultrasound signal having frequencies substantially within a range of 25 kHz and 45 kHz.

6. The system of claim 1, wherein the slurry contains detergent in an amount of substantially no greater than 0.2 weight % of the amount of water.

7. The system of claim 1, wherein the slurry contains detergent in an amount of substantially no greater than 1.0 weight % of the amount of water.

8. The system of claim 1, wherein the water is at a temperature not exceeding substantially 120 degrees Fahrenheit.

9. A method of treating particulate solids, comprising the steps of:
   supplying a screw feeder for transporting contaminated particulate solids, the screw feeder having a plurality of flights each separated from one another by a predetermined distance that is no greater than a width of the active region of an ultrasound signal;
   supplying a continuous flow of water through the screw feeder;
   supplying the particulate solids into the screw feeder, the particulate solids and the water forming a slurry;
   supplying the ultrasound signal;
   transporting, by the screw feeder, the slurry containing the particulate solids through the ultrasound signal for a predetermined amount of time, the ultrasound signal through which the slurry is transported being of sufficient size and strength to cause contaminants to separate from the particulate solids.

10. The method of claim 9, wherein supplying the ultrasound signal comprises disposing a plurality of ultrasonic transducers circumferentially around a perimeter of at least a portion of the screw feeder, each of the ultrasonic transducers producing a respective ultrasound signal that collectively are of sufficient size and strength to cause the contaminants to separate from the particulate solids.

11. The method of claim 9, wherein supplying the ultrasound signal comprises disposing a stack of ultrasonic transducers along a portion of an exterior of the screw feeder, each of the ultrasonic transducers producing a respective ultrasound signal and having a diameter substantially the same as a pitch of the screw feeder.

12. The method of claim 9, comprising producing, during transporting of the slurry by the screw feeder, a turbulence in the slurry to cause the particulate solids to be stirred and rotated.

13. The method of claim 9, wherein the ultrasound signal has a frequency substantially within a range of 25 kHz and 45 kHz.

14. The method of claim 9, comprising adding a detergent to the slurry in an amount of substantially no greater than 0.2 weight % of the amount of water.

15. The system of claim 9, wherein the slurry contains detergent in an amount of substantially no greater than 1.0 weight % of the amount of water.

16. The method of claim 9, wherein supplying a continuous flow of water comprises supplying a continuous flow of water having a temperature not exceeding substantially 120 degrees Fahrenheit.

17. A system for treating particulate solids, comprising:
an ultrasonic transducer producing an ultrasound signal;
a tank having a chamber substantially fully disposed within an active zone of the ultrasound signal;
a rotating screw feeder having a portion extending through the active zone of the ultrasound signal produced by the ultrasonic transducer, the screw feeder having a plurality of flights each separated from one another by a predetermined distance that is no greater than a width of the active zone of the ultrasound signal; and
a slurry including water and the particulate solids, the chamber of the tank containing the particulate solids of the slurry within the active zone of the ultrasound signal, wherein the ultrasound signal agitates the particulate solids disposed within the entire chamber sufficient to cause contaminants to separate from the particulate solids.

18. The system of claim 17, wherein the ultrasonic transducer produces an ultrasound signal having frequencies substantially within a range of 25 kHz and 45 kHz.

19. The system of claim 17, wherein the slurry contains detergent in an amount of substantially no greater than 0.2 weight % of the amount of water.

20. The system of claim 17, wherein the slurry contains detergent in an amount of substantially no greater than 1.0 weight % of the amount of water.

21. The system of claim 17, wherein the water is at a temperature not exceeding substantially 120 degrees Fahrenheit.

22. The system of claim 2, wherein each of the ultrasonic transducers are positioned above the flights of the screw feeder.

23. The method of claim 9, wherein the particulate solids are selected from the group consisting of group IV metals and nickel based alloys.

* * * * *